(12) United States Patent
Rangarajan et al.

(10) Patent No.: US 12,300,008 B1
(45) Date of Patent: May 13, 2025

(54) SENSITIVE PATTERN RECOGNITION OF IMAGES, NUMBERS AND TEXT

(71) Applicant: FIRST AMERICAN FINANCIAL CORPORATION, Santa Ana, CA (US)

(72) Inventors: Arun Rangarajan, Irvine, CA (US); Zheqi Tan, Madison, WI (US); Madhu Kolli, Tustin, CA (US)

(73) Assignee: FIRST AMERICAN FINANCIAL CORPORATION, Santa Ana, CA (US)

( * ) Notice: Subject to any disclaimer, the term of this patent is extended or adjusted under 35 U.S.C. 154(b) by 295 days.

(21) Appl. No.: 17/733,603

(22) Filed: Apr. 29, 2022

(51) Int. Cl.
G06V 30/10 (2022.01)
G06V 10/22 (2022.01)
G06V 30/413 (2022.01)

(52) U.S. Cl.
CPC .............. G06V 30/10 (2022.01); G06V 10/22 (2022.01); G06V 30/413 (2022.01)

(58) Field of Classification Search
CPC ....... G06V 30/10; G06V 10/22; G06V 30/413
USPC ........................................................ 382/229
See application file for complete search history.

(56) References Cited

U.S. PATENT DOCUMENTS

| | | | |
|---|---|---|---|
| 10,867,073 B1 | 12/2020 | Yang et al. | |
| 2015/0205978 A1* | 7/2015 | Eisen | H04N 1/00872 726/27 |
| 2023/0244987 A1* | 8/2023 | Truong | G06N 20/00 706/11 |

FOREIGN PATENT DOCUMENTS

WO WO 2020/093165 5/2020

OTHER PUBLICATIONS

Liao et al., "In the Blink of AI—How Artificial Intelligence is Changing the Way Enterprises Protect Sensitive Data in Images," Netskope Blog, Jul. 27, 2020, https://www.netskope.com/blog/in-the-blink-of-ai-how-artificial-intelligence-is-changing-the-way-enterprises-protect-sensitive-data-in-images#:~:text=The%20traditional%20approach%20to%20identifying,delays%20detection%20of%20security%20violations, 6 pages.
Google Cloud, "Inspecting images for sensitive data," Data Loss Prevention, 2022, https://cloud.google.com/dlp/docs/inspecting-images, 6 pages.

* cited by examiner

*Primary Examiner* — Huy C Ho
(74) *Attorney, Agent, or Firm* — Sheppard, Mullin, Richter & Hampton LLP

(57) ABSTRACT

Some implementations of the disclosure describe a method, comprising: obtaining, at a computing device, a document image file; generating, at the computing device, using a first trained model, a first prediction including a first location of a sensitive information pattern within the document image file that contains a sensitive element and an identification of the sensitive element; generating, at the computing device, using a second trained model, a second prediction including a second location of a first sensitive sequence of characters within the document image file; determining, at the computing device, that the second location is within the first location; and after determining that the second location is within the first location, generating, at the computing device, an output including the second location or a redaction of the first sensitive sequence of characters within the document image file.

20 Claims, 18 Drawing Sheets

Social Security Number or Tax ID: 388-▮▮▮

Social Security No.: 136-▮▮▮

Date of Birth: 9/23/1967

Birth date: November 9, 1974

Driver License Number: 1400▮▮▮

Driver's license no. and state: X7▮▮▮ 9 ▮

U.S. Passport # 13▮▮▮

Invalid #./ Passport No.
L 32▮▮▮

057340523

401-74991443

11-Jul-1977

2/10/2012

771 Treat Ave

, San Francisco, CA 94110

FIG. 2B

Document

Name: John Q. Public

Date of Birth: February 5, 1985

Social Security No.: 123-45-6789

Driver License No.: AB9876

The person's passport number is 2456798. The case has been assigned the file no. 6100-948274.

Ref # AX-432872-1992

For reference, the following social security card scan is provided.

Name:

Signature:

Date: April 5, 2007

Document

Name: John Q. Public

Date of Birth: February 5, 1985

Social Security No.: 123-45-6789

Driver License No.: AB9876

The person's passport number is 2456798. The case has been assigned the file no. 6100-948274.

Ref # AX-432872-1992

For reference, the following social security card scan is provided.

Name:

Signature:

Date: April 5, 2007

Document

Name: John Q. Public

Date of Birth: ▆▆▆▆▆▆▆▆▆

Social Security No.: ▆▆▆▆▆▆▆▆▆

Driver License No.: ▆▆▆▆▆▆

The person's passport number is ▆▆▆▆▆▆. The case has been assigned the file no. 6100-948274.

Ref # AX-432872-1992

For reference, the following social security card scan is provided.

Name:

Signature:

Date: April 5, 2007

Document

Name: John Q. Public

Date of Birth: February 5, 1985

Social Security No.: 123-45-6789

Driver License No.: AB9876

The person's passport number is 2456798. The case has been assigned the file no. 6100-948274.

Ref # AX-432872-1992

For reference, the following social security card scan is provided.

Name:

Signature:

Date: April 5, 2007

Document

Name: John Q. Public

Date of Birth: February 5, 1985

Social Security No.: 123-45-6789

Driver License No.: AB9876

The person's passport number is 2456798. The case has been assigned the file no. 6100-948274

Ref # AX-432872-1992

For reference, the following social security card scan is provided.

Name:

Signature:

Date: April 5, 2007

Document

Name: John Q. Public

Date of Birth: February 5, 1985

Social Security No.: 123-45-6789

Driver License No.: AB9876

The person's passport number is 2456798. The case has been assigned the file no. 6100-948274.

Ref # AX-432872-1992

For reference, the following social security card scan is provided.

Name:

Signature:

Date: April 5, 2007

Document

Name: John Q. Public

Date of Birth: February 5, 1985

Social Security No.: 123-45-6789

Driver License No.: AB9876

The person's passport number is 2456798. The case has been assigned the file no. 6100-948274.

Ref # AX-432872-1992

For reference, the following social security card scan is provided.

Name:

Signature:

Date: April 5, 2007

$A_e = |x_2 - x_1| * |y_1 - y_2|$ $A_i = |X_2 - x_1| * |y_1 - Y_2|$

SENSITIVE PATTERN RECOGNITION OF IMAGES, NUMBERS AND TEXT

BACKGROUND

The identification of all sensitive information in scanned document images can be a challenging problem. Such documents may have a varied orientation of scanned sensitive images such as driver's licenses, passports, bank cards, social security cards, signatures, and the like. This problem is amplified when the document has other sensitive information about an individual, that can be handwritten or printed, and can vary in length. For example such documents may include birthdates, social security numbers, passport numbers, loan numbers, telephone numbers, addresses, and the like.

SUMMARY

Some implementations of the disclosure describe techniques for utilizing multiple trained models to independently predict potentially sensitive data elements in a document image file, and combine the outputs of the multiple trained models to arrive at an identification of sensitive data patterns in a fast and efficient way.

In one embodiment, a non-transitory computer-readable medium has executable instructions stored thereon that, when executed by a processor, cause the processor to perform operations comprising: obtaining a document image file; generating, using a first trained model, a first prediction including a first location of a sensitive information pattern within the document image file that contains a sensitive element and an identification of the sensitive element; generating, using a second trained model, a second prediction including a second location of a first sensitive sequence of characters within the document image file; determining that the second location is within the first location; and after determining that the second location is within the first location, generating an output including the second location or a redaction of the first sensitive sequence of characters within the document image file. In some implementations, a system includes the processor and non-transitory computer-readable medium.

In some implementations, the operations further comprise: generating, using a third trained model, a third prediction including a third location of a scanned document within a subset of a page of the document image file.

In some implementations, generating the output comprises: in response to determining that the second location is within the first location, redacting, based on the second location, the first sensitive sequence of characters within the document image file; redacting, based on the third location, the scanned document within the document image file; and after redacting the first sensitive sequence of characters and the scanned document within the document image file, transmitting the document image file.

In some implementations, the second location comprises a first set of coordinates within the document image file; the third location comprises a second set of coordinates within the document image file; and generating the output, comprises: returning the first set of coordinates and the second set of coordinates.

In some implementations, the first sensitive sequence of characters comprises: a birthdate, an address, a phone number, or an identification number; and the scanned document comprises: an identification card, a bank card, or a check.

In some implementations, determining that the second location is within the first location, comprises: determining that an area of intersection between the first location and the second location meets a threshold. In some implementations, determining that the area of intersection between the first location and the second location meets the threshold comprises: comparing the area of intersection to an area of the second location.

In some implementations, the first trained model is a first object detection model and the second trained model is a second object detection model.

In some implementations, the first prediction further includes a label indicative of the identification of the sensitive element; and generating the output, comprises: returning the second location and the label.

In some implementations, the operations further comprise generating the first trained model by: obtaining multiple textual data representations of multiple document image files; identifying, using at least regular expression-based rules, and the multiple textual data representations, multiple locations within the multiple document image files and multiple labels corresponding to the multiple locations, wherein each of the multiple locations contains a potentially sensitive information pattern including a sensitive element and an identification of the sensitive element, and each label is indicative of the identification of the sensitive element of a corresponding one of the locations; and training, based on the multiple document image files, the multiple locations, and the multiple labels, an object detection model as the first trained model.

In some implementations, the operations further comprise generating the second trained model by: obtaining multiple textual data representations of multiple document image files; identifying, using at least regular expression-based rules, multiple text strings within the multiple textual data representations that potentially contain sensitive information; determining a location of each of the multiple text strings within the multiple document image files; and training, based on the multiple document image files and the locations of the multiple text strings, a model as the second trained model.

In one embodiment, a method comprises: obtaining, at a computing device, a document image file; generating, at the computing device, using a first trained model, a first prediction including a first location of a sensitive information pattern within the document image file that contains a sensitive element and an identification of the sensitive element; generating, at the computing device, using a second trained model, a second prediction including a second location of a first sensitive sequence of characters within the document image file; determining, at the computing device, that the second location is within the first location; and after determining that the second location is within the first location, generating, at the computing device, an output including the second location or a redaction of the first sensitive sequence of characters within the document image file.

Other features and aspects of the disclosed technology will become apparent from the following detailed description, taken in conjunction with the accompanying drawings, which illustrate, by way of example, the features in accordance with implementations of the disclosed technology. The summary is not intended to limit the scope of any inventions described herein, which are defined by the claims and equivalents.

It should be appreciated that all combinations of the foregoing concepts (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE DRAWINGS

The present disclosure, in accordance with one or more implementations, is described in detail with reference to the following figures. The figures are provided for purposes of illustration only and merely depict example implementations.

FIG. 2B illustrates six examples of data elements that were identified within document images using an element detection model, in accordance with some implementations of the disclosure

The figures are not exhaustive and do not limit the present disclosure to the precise form disclosed.

DETAILED DESCRIPTION

A traditional approach for identifying sensitive patterns of information in scanned documents relies on using optical character recognition (OCR) and a rules-based element matching such as regular expression (regex) to identify sensitive information patterns. The problem with such approaches is that they can be computationally inefficient, misidentify data elements in poorly scanned documents as sensitive or not sensitive, and be cost inefficient.

The systems and methods described herein utilize multiple trained models to independently predict potentially sensitive data elements in a document image, and combine the outputs of the multiple trained models to arrive at an identification of sensitive data patterns in a fast and efficient way relative to existing techniques. As further described herein, each trained model may be a vision-based model (and in particular embodiments, an object detection model) that is trained to identify particular patterns of sensitive images, numbers, and/or text directly on the image itself and predict the location (e.g., coordinates) of a sensitive element on a given page.

The systems and methods described may improve the computational performance, cost efficiency, and/or sensitive element coverage in an application for identifying a sensitive pattern of information. For example, by virtue of combining the outputs of multiple trained models that identify sensitive patterns on an image instead of OCRed text, runtime performance may greatly improve, which can provide cost efficiencies. Additionally, by virtue of utilizing the techniques described herein, sensitive data element detection coverage may be expanded relative to some existing techniques. For example, the techniques described herein may be used to identify multiple varied formats of sensitive elements such as rotated driver license images, poorly scanned passports, handwritten or printed sequences of sensitive characters having varying lengths, and other sensitive data elements. These and other advantages that may be realized by implementing the techniques described are further discussed below.

Figure 1:
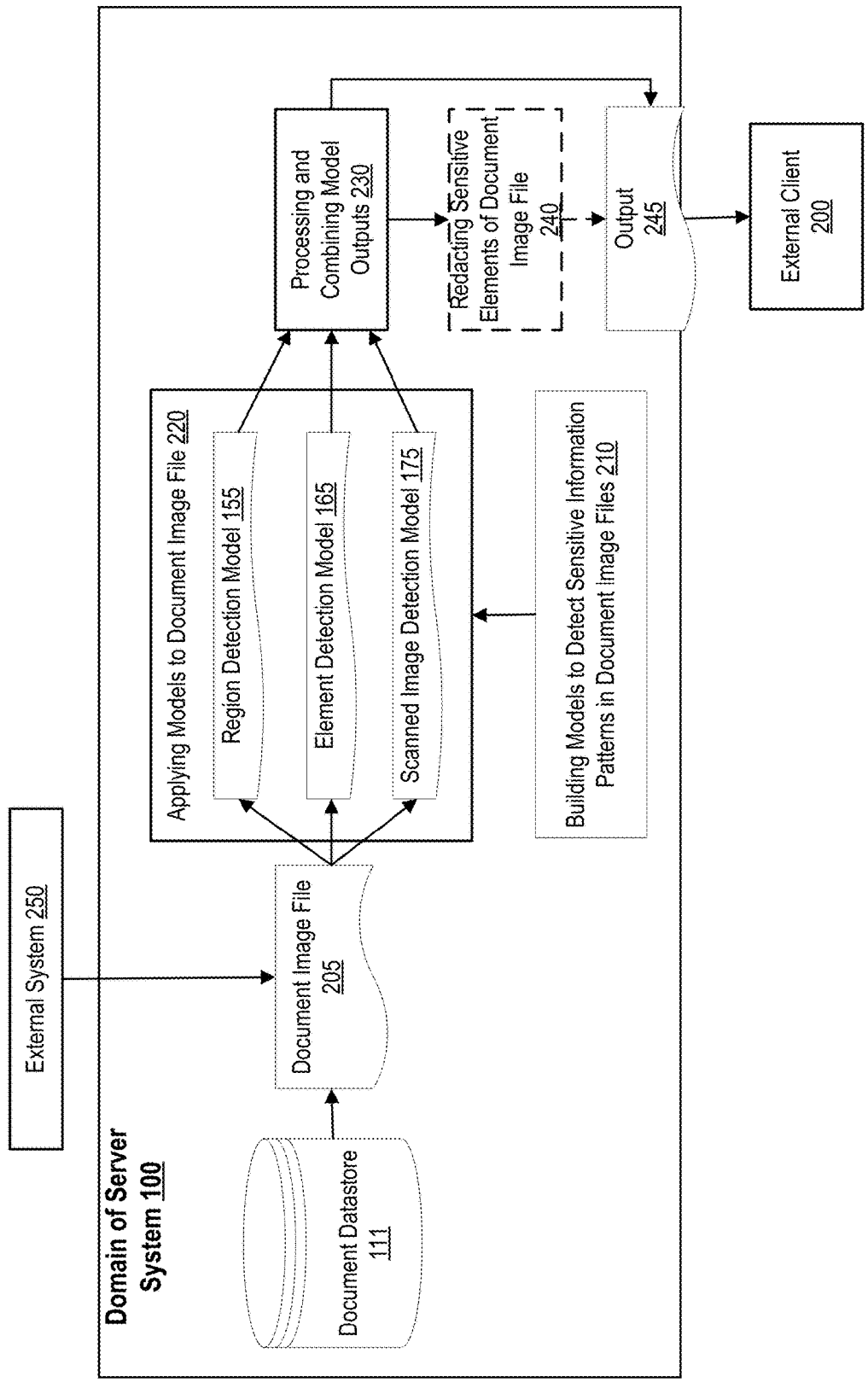
FIG. 1 depicts a flow diagram illustrating a method showing the general operation of a server system, in accordance with some implementations of the disclosure.

FIG. 1 depicts a flow diagram illustrating a method showing the general operation of a server system 100, in accordance with some implementations of the disclosure. Operation 210 includes building models for detecting sensitive information patterns in document image files. As depicted in this example, a region detection model 155, an element detection model 165, and a scanned image detection model 175 are built. These models may be vision-based models that do not rely on OCR to identify sensitive elements. Each model may employ a neural network that is good at object detection, and it may be tuned to detect particular sensitive information and localize it (e.g., with coordinates) on a given page or image. Particular methods for building such models are further described below.

Figure 2A:
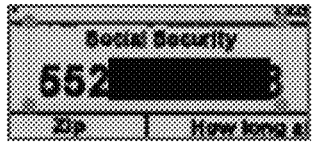
FIG. 2A illustrates ten examples of regions containing NPI that were identified within document images using a region detection model, in accordance with some implementations of the disclosure.
Figure 2A:
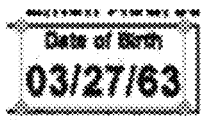

As described herein, a region detection model 155 is configured to identify a region of interest within a document image that contains a sensitive information pattern including a sensitive element and an identification of the sensitive element. The sensitive element may be nonpublic personal information (NPI) such as a particular social security number (SSN), date of birth, driver's license number, or passport number. The identification of the sensitive element may be a label identifying the sensitive element (e.g., the label "social security number"). FIG. 2A illustrates ten examples of regions containing NPI that were identified within document images using a region detection model 155, in accordance with some implementations of the disclosure. In the illustrated examples, the region detection model identifies the boundaries of a region containing both NPI (e.g., document number or birthdate) and an identification of the NPI (e.g., "social security", "date of birth", "driver license", "driver's license", "Passport", etc.). As further described herein, the region detection model 155 may serve as a first-level detector that identifies regions potentially containing NPI.

As described herein, an element detection model 165 is configured to identify sequences or patterns of characters/text within a document image that could potentially be sensitive elements (e.g., NPI). For example, the sequences of characters may be a sequence of numbers, a date, an address, and the like. FIG. 2B illustrates six examples of data elements that were identified within document images using an element detection model 165, in accordance with some implementations of the disclosure. In the illustrated examples, the element detection model 165 identifies the boundaries of a location containing digits (first two examples), dates (next two examples), or addresses (final two examples). In some embodiments, to improve runtime performance, the model 165 may identify sequences of numbers having a certain number of digits. For example, in a particular embodiment the model may be trained to identify sequences of numbers have 6 to 16 digits.

In contrast, to the region detection model 155, which may be configured to identify regions containing NPI and an identification of the NPI, the element detection model is configured to identify specific text that may be an NPI element. As further described below, the outputs of these two models on a document image may be combined to improve sensitive element detection speed and precision.

As described herein, a scanned image detection model 175 is configured to identify a location of a scanned document within a document image. The scanned document may be an identification card, a bank card, or a check. For example, the scanned image detection model 175 may identify, within a document image, a scanned driver's license, passport, check, credit card, debit card, social security card, and the like. The output of scanned image detection model 175 may be processed independently of the output of region detection model 155 and element detection model 165.

Although server system 100 is depicted in the example of FIG. 1 as both building and applying the models, separate systems may be utilized to create and apply the models.

After the models are built, they may be applied as part of an application or workflow that detects sensitive data in a new document image file 205 (operations 220-230), and, optionally, redacts the sensitive data (operation 240). This workflow may be performed in response to a processing request from an external client 200 for one or more documents. For example, an application run by an external client 200 may initiate a request for a document image file 205 stored at a document datastore 111 of server system 100. The external client 200 may need to access the document image file for title examination, mortgage review, or some other purpose. Alternatively, the workflow may be automatically performed by server system 100 in response to ingesting a new document image file 205 or batch of document files from an external system 250.

Figure 3:
FIG. 3 depicts an example document image file before sensitive data element detection

For ease of illustration, the workflow for detecting and redacting sensitive data (operations 220-240) in an obtained document image file 205 is described with reference to FIGS. 3-5, which depict an example document image file 205 at various stages of the workflow. FIG. 3 depicts an example document image file 205 input into the workflow. The unredacted image includes various sensitive data elements, including a date of birth, a social security number, a license number, a passport number, and a scanned social security card.

Operation 220 includes applying each of the models to the document image file 205. In some implementations, prior to applying the models, the image may be preprocessed. Pre-processing may normalize the image so that the results of applying the models to different document images is more consistent. For example, the image may be rotated, denoised, and/or deblurred. In some implementations, the brightness and/or contrast of the image may be changed during pre-processing.

Referring to the example of FIG. 3, the document image file 205 is input into a region detection model 155 that outputs predictions of image locations corresponding to sensitive information patterns containing both a sensitive element and an identification of the sensitive element. In the example of FIG. 3, the image locations predicted by model 155 may include: "Date of Birth: Feb. 5, 1985", "Social Security No.: 123-45-6789", "Driver License No.: AB9876", and "passport number is 2456798". Each of the image locations predicted by model 155 may be in the form of coordinates identifying boundaries of the image location. For example, where the region detection model detects locations as bounding boxes, the bounding box may be defined by a set of four coordinates (e.g., x_min, y_min, x_max, y_max) within the image. Particular methods for training region detection model 155 to detect such sensitive information patterns are further described below. In addition to predicting the locations, the region detection model 155 may output a confidence score associated with each prediction. The confidence score may be expressed as a percentage (e.g., 70%, 80%, 90%, 100%, etc.), a number from 0 to 1 (e.g., 0.7, 0.8, 0.9, 1, etc.), or another format. In some implementations, the prediction output by region detection model 155 may also include a specific class or category of sensitive data associated with the image location. For example, for the region including "Date of Birth: Feb. 5, 1985", the model may output the class label "birthdate" in addition to pixel coordinates of the location of that the region and a confidence score (e.g., "95%").

The document image file 205 is also input into an element detection model 165 that outputs predictions of locations of potentially sensitive sequences of characters within the document image. In the example of FIG. 3, the image locations predicted by model 165 may include "Feb. 5, 1985", "123-45-6789", "AB9876", and "2456798", "6100-948274", "AX-432872-1992", and "Apr. 5, 2007". Each of the image locations predicted by model 165 may be in the form of coordinates identifying boundaries of the image location (e.g., a bounding box defined by four coordinates). Particular methods for training element detection model 165 to detect such potentially sensitive sequences of characters are further described below. In addition to predicting the locations, the element detection model 165 may output a confidence score associated with each prediction.

The document image file 205 is also input into a scanned image detection model 175 that outputs predictions of locations of scanned documents within the document image. In the example of FIG. 3, model 175 predicts the location of the scanned social security card within the document image. Each of the image locations predicted by model 175 may be in the form of coordinates identifying boundaries of the image location. Particular methods for training scanned image detection model 175 to detect scanned documents within an image are further described below. In addition to predicting the locations, the scanned image detection model 175 may output a confidence score associated with each prediction.

Following application of the models, operation 230 includes processing and combining the model outputs. During processing and combining of the outputs of region detection model 155 and element detection model 165, only locations detected by both models as including sensitive elements may be considered to contain sensitive elements. For example, referring to the document of FIG. 3, the location associated with "AB9876" may be considered to contain a sensitive element because it was identified by both models, whereas the location of "Apr. 5, 2007" may not be considered to contain a sensitive element because it was only identified by the element detection model 165. By virtue of combining the outputs of these models, sensitive element detection precision may be improved. While the region detection model 165 identifies locations of all potential instances of regions containing sensitive data elements (e.g., NPI) within a document image, the element detection model 155 may confirm the result by identifying a location that overlaps with the region identified by the region detection model 165. As such, the combination of the outputs of both models may reduce the false positive rate due to locations that are incorrectly flagged by the region detection model 165 as containing sensitive elements. Additionally, in instances where the region detection model 155 does not detect a sensitive region within a given image/page, the element detection model 155 may not be applied to that image to improve system processing speed. The foregoing advantages may be amplified in a large-scale environment that processes many document images per day (e.g., millions of images across hundreds of thousands of document files). In such an environment, even a small 1% false positive rate from relying on only a single model could have a significant impact on system performance.

After processing and combining the model outputs, model predictions may be provided on a per page/per image basis as output 245. For example, the system may store metadata associating the following information with each page or image: page number, coordinates of each sensitive element identified on page, and confidence score associated with each prediction. As another example, the system may store metadata associating the following information with each sensitive element: page number, coordinates on page, and confidence score associated with prediction of the sensitive element. The metadata my may be stored in a table, an array, or other suitable data structure.

Figure 4:
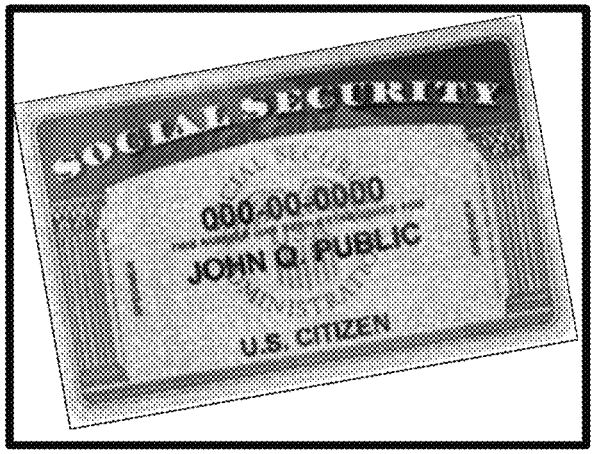
FIG. 4 is an example showing boundaries illustrating locations of sensitive data elements identified in the document of FIG. 3 after performing operations in accordance with some implementations of the disclosure

FIG. 4 is an example showing boundaries illustrating locations of sensitive data elements identified in the document of FIG. 3 after performing operations 220-230. As depicted in this example, the location of the scanned social security card was identified by applying the scanned image detection model 175. The locations of the other sensitive data elements was identified by applying the region detection model 155 and element detection model 165, and combining the results of both models.

Optional operation 240 includes redacting the identified sensitive elements of the document image file. The document image may be redacted in preparation for transmitting a copy (e.g., as output 245) to an external client 200, or to maintain a local redacted version. The document image may be redacted based on the identified locations of the sensitive element. For example, given the coordinates identifying a location of NPI within an image, that pixels of that portion of the image may modified. For example, the portion of the image may be modified by blacking it out, whiting it out, or replacing it. FIG. 5 is an example showing the document of FIG. 3 after performing operation 240. As depicted in this example, the sensitive data elements of the document are blacked out.

Figure 5:
FIG. 5 is an example showing the document of FIG. 3 after redacting identified sensitive data elements, in accordance with some implementations of the disclosure.

Although the example of FIGS. 3-5 illustrates operations 220-240 being applied to a single image or page, this workflow could be applied to document image files having multiple pages. In such implementations, operations 220-240 may be repeated for each page of the document image file.

Figure 6:
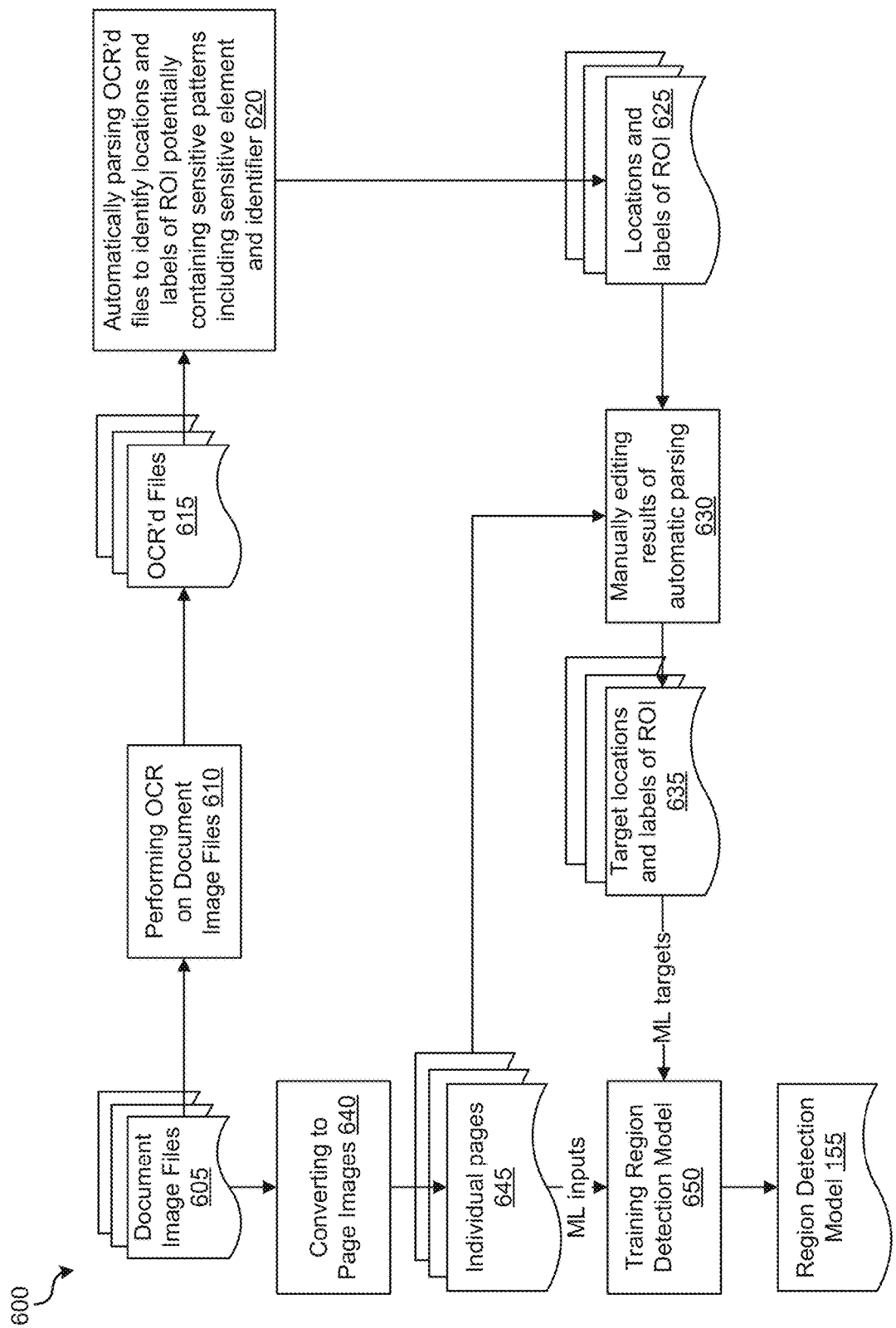
FIG. 6 is an operational flow diagram illustrating an example method of building a region detection model from a dataset of unlabeled document image files, in accordance with some implementations of the disclosure.

In some implementations, both the redacted document image file and metadata associated with the identified sensitive elements (e.g., page numbers, coordinate locations, confidence scores) are made available to an external client 200. In some implementations, only one of the redacted document image file or metadata are made available FIG. 6 is an operational flow diagram illustrating an example method 600 of building a region detection model 155 from a dataset of unlabeled document image files 605, in accordance with some implementations of the disclosure.

The document image files 605 may include thousands, millions, or even billions of documents stored in a document image format (e.g., png, tiff, pdf, etc.). For example, in implementations where server system 100 is utilized by a title insurance company, these documents may comprise deeds, mortgages, and various other documents relating to parcels of real property from different states and counties. To illustrate, the document image files 605 may include: county recorded document images from all U.S. states; title and escrow document images; document forms such as 1099 forms; handwritten documents such as open orders and wire requests; residential loan applications; settlement statements; and the like. As such, the document images may include a combination of documents images containing unstructured text (e.g., deed of trust), document images containing semi structured text (e.g., wire request), and structured document images (e.g., death certificates).

Operation 610 includes performing OCR on each of the document image files to obtain OCR'd files 615. In some implementations, the OCR'd document files 615 may be in an Extensible Markup Language (XML) or JavaScript Object Notation (JSON) format. The document image files 605 may be converted to the OCR'd files 615 using any suitable OCR engine (e.g., any OCR engine capable of converting PDF/TIFF files to XML/JSON files).

In some implementations, multiple OCR engines may be used. As different OCR engines may interpret images differently, the outputs from the multiple OCR engines may be combined to compare their scores and utilize the output to train the model as some OCR engines specialize with certain types of documents (e.g., forms) and other types of OCR engines specialize with other types of documents (e.g., documents containing handwriting). A particular embodiment that utilizes multiple OCR engines is further described below with reference to FIG. 7.

Operation 620 includes automatically parsing each of the OCR'd files 615 to identify locations (e.g., bounding box coordinates) and labels of any regions of interest 625 potentially containing sensitive patterns including a sensitive element and identifier of the sensitive element. For example, class labels may include "SSN", "Date of Birth", "Driver's License", "Passport", and the like. A parser implementing regular expression (regex) rules adapted to find regions of interest potentially containing both sensitive data elements (e.g., NPI) and an identification of the sensitive data element (e.g., NPI identifier), may detect the regions of interest within the OCR'd files 615. For each identified region of interest on a given page, the parser may return the location of the region of interest along with a class or category label identifying the type of sensitive data element contained in the region of interest. The location of the region of interest returned by the parser may be mapped to pixel coordinates in a page of the document image file 605 corresponding to the OCR'd file 615 that was parsed. The parser may map to pixel coordinates through the use of an OCR engine that identifies bounding box coordinates of OCRed words.

For a given page, the parser may search through all words on the page and identify every instance of an identifier and element (e.g., NPI identifier and element). For example, if the parser is to search for instances of a SSN, it may be implement regex rules that search for the identifier "SSN" or "social security" and the actual NPI element itself, i.e., the string of numbers that correspond to the SSN. After identifying each identifier and element, the parser may calculate a distance between the identifier and the element. If the element matches a regex rule and is within a certain distance of the identifier, the element may be assigned to the identifier, and the identifier and element may be correspondingly combined into one single output that includes the pixel coordinates of a bounding box enclosing the combined identifier and element. This process may repeat for all identifiers and elements of interest (e.g., SSN, Driver's License, etc.) on a given page, and repeat for each page of the OCR'd document.

To enable manual editing of the results of automatically parsing the OCR'd files and subsequent training, operation 640 includes converting the pages of each of the document image files 605 to individual images 645. For example, a PDF of multiple pages images may converted into multiple PNG files, each PNG file corresponding to a page.

Operation 630 includes manually editing the results (locations and labels of ROI 625) of automatically parsing the OCR'd files to obtain target locations and labels of the ROI 635. For example, the system may present a graphical user interface (GUI) to the user that displays, for each individual image/page 645, any identified locations and labels. An identified location (e.g., pixel coordinates) may be displayed on its corresponding image 645 as a bounding box in the image. In response to presenting the GUI, the system may receive data corresponding to user input tagging any regions within the image that contain sensitive data and the automatic process missed. For example, the user may draw new bounding boxes and add corresponding labels. Additionally, the system may receive documents that were exclusively hand labeled. Such documents may be uploaded by the user. To fix errors such as the identified region of interest not bounding all of the sensitive data, or bounding too much data, the GUI may display the bounding boxes around the identified ROI, and the user may adjust the size and areas covered by the bounding boxes. The user may also modify any tags/labels associated with each of the bounding boxes.

One advantage of using a parser implementing custom regex rules to automatically detect ROIs in a first pass through is that the process of building the model can be dramatically sped up. Instead of hand labeling all document images for training, regex rules may be used to automatically to find ROI. Subsequently, hand editing and labeling may be primarily relied upon as a mechanism to fix any errors of the automated process. This technique enables training on a substantially larger dataset, which can improve the predictive capability of the developed model.

Operation 650 includes training a region detection model 155 based on a training dataset including an input dataset and a target dataset. In this case, the region detection model is trained to extract features from an input page image, and output a target prediction of the location (e.g., bounding box expressed as pixel coordinates) and label of each ROI in the image that contains sensitive data and an associated identifier, if any such ROI are found. As such the input training dataset may include at least some of the individual page images 645. The target training dataset may include at least some of the target locations and labels of ROI 635. For example, for each region of interest, the target training dataset may utilize a label file that contains a class and the bounding box coordinates of the region of interest. The region detection model may also output a confidence score associated with each prediction.

During training, the input and target datasets may be split between training data and validation/testing data as needed, where each of the training data and validation data respectively contains corresponding label files and images. For example 80% of the data may be assigned for training, and 20% of the data may be assigned for validation. Weights may be initialized at random and updated as the training process runs. The training process may run for as many epochs as needed until metrics on the validation data reach acceptable levels (e.g., 95% precision and 90% recall for all classes). The training process outputs the weights of the model (which are then used for inference on new data).

A deep learning algorithm such as one or more neural networks (e.g., convolutional neural networks) may be used to develop the region detection model. The deep learning algorithm may be based on object detection. For example, a one-stage object detection algorithm that predicts bounding boxes over images. Examples of one-stage object detection algorithms that may be utilized include: any version of You only look once (YOLO), RetinaNet, Single Shot Detector (SSD), or the like. One advantage of using a one-stage object detection algorithm in an application for identifying sensitive elements when the document dataset is large (e.g., in the millions or billions) is that such algorithms are fast relative to other object detection algorithms such as two-stage object detection algorithms. This may be particularly advantageous in the present disclosure where the results of two different object detection models (e.g., region detection model 155 and element detection model 165) may be combined to recognize sensitive numbers and text, thereby reducing any potential tradeoff in detection accuracy due to the use of a one-stage object detection algorithm.

In alternative implementations, a two-stage object detection algorithm may be utilized. For example, a Region-based Convolutional Neural Network (R-CNN) may be utilized.

An advantage of using an object detection model in the systems and methods described herein is its ability to both classify objects within an image and give the location of the object within the image. By contrast, other advanced vision models may only classify the object without tagging the location. Another advantage of using an object detection model is its ability to scale despite having high variability in the potential input images. For example, an alternative to using a vision-based model would be to OCR the image and rely on searches or build a natural language model (NLP) that learns various patterns from raw text. However, such approaches are unlikely to scale well with high image variability in ROI locations as OCR typically reads text from left to right, which could lead to a large number of false negatives.

In other implementations, the region detection model 155 may be based on models other than object detection models.

Figure 7:
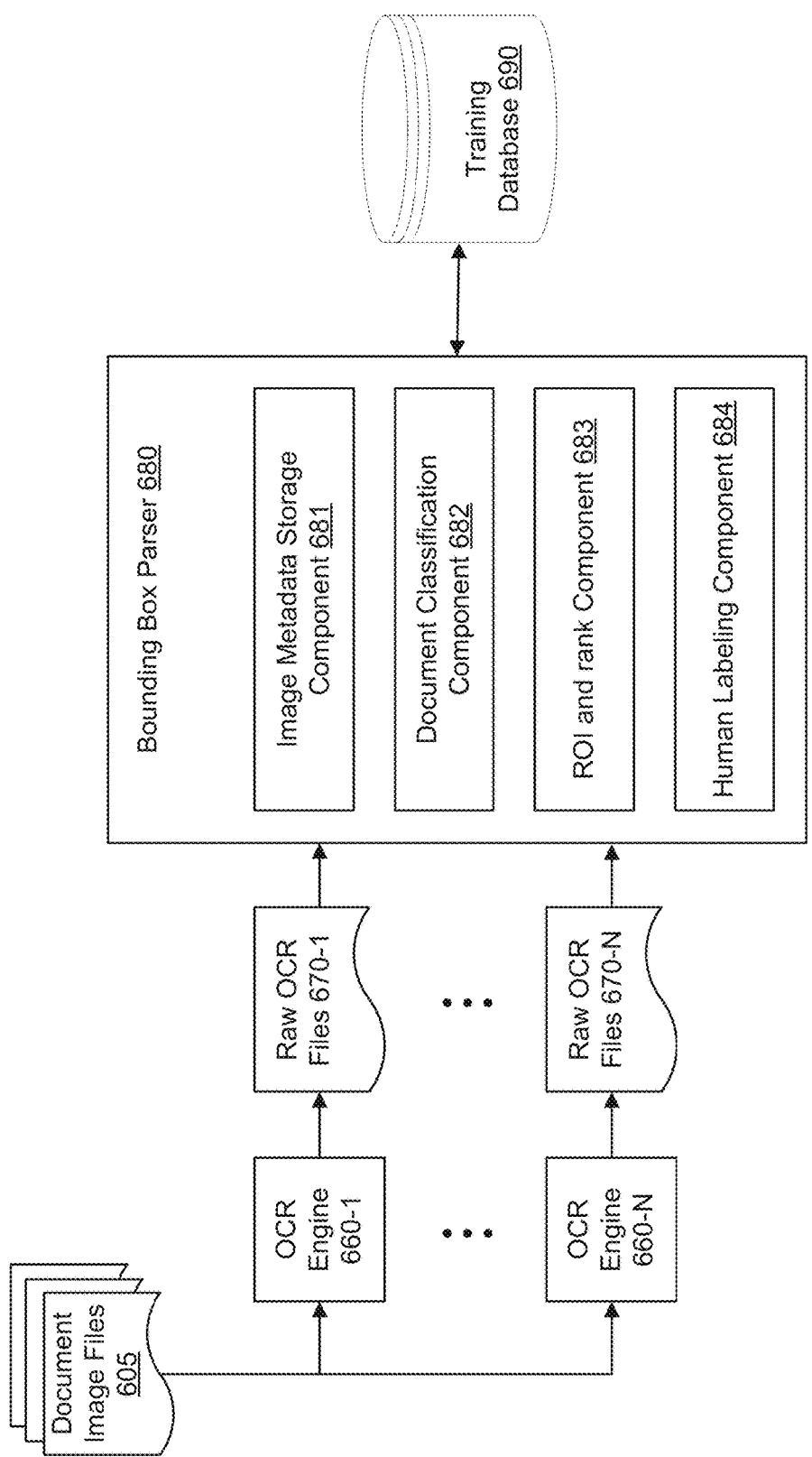
FIG. 7 is a flow diagram illustrating example components of a system that may be used to build a training database of a region detection model by following a particular implementation of the method of FIG. 6, in accordance with some implementations of the disclosure.

FIG. 7 is a flow diagram illustrating example components of a system that may be used to build a training database 690 of a region detection model 155 by following a particular implementation of method 600, in accordance with some implementations of the disclosure. In this example, the unlabeled document image files 605 are OCRed using multiple unique OCR engines 660-1 to 660-N to generate multiple respective raw OCR files (e.g., text files) 670-1 to 670-N.

The raw OCR files 670-1 to 670-N may thereafter be used by a bounding box parser 680 to build a training database 690 containing relevant image metadata and bounding box region information (e.g., coordinates and labels). The bounding box parser 680 includes an image metadata storage component 681 configured to receive the raw OCR files 670 and store metadata for each OCRed document image (e.g., each page image) in training database 690. For example, image metadata that may be stored by component 681 may include an image path in an image repository storage location, a unique identifier of the image, and an identification of the OCR Engines that processed the image successfully. By way of illustration, Table 1 shows an example of metadata that may be stored for each image by image metadata storage component 681.

TABLE 1

| Column Name in Training Database | Value Examples |
| --- | --- |
| Image Path | Image Repository location |
| Image Unique Identifier | 2020-10-15_02-33-32-tg_87a15c283d7c43zf89e1t61be9152b9d |
| OCR Engine Processed | OCR Engine 1, OCR Engine 2, OCR Engine 3 |

The bounding box parser 680 further includes a document classification component 682 configured to receive the raw OCR files 670, identify the class of each document image, and store the document image class and a confidence score associated with the document class in training database 690. In some implementations, a natural language processing model and regular expressions may be used to identify the document image classes. One advantage of identifying the document image class in training database 690 is that it enables better evaluation of different patterns of sensitive elements in different variations of image categories, which may be used to incrementally add specific categories of document for training purposes when a given document image class performs poorly during model validation/testing. For example, if performance is poor for deeds of trust, more deeds of trust may be added to the dataset. By way of illustration, Table 2 shows an example of metadata that may be stored for each document class by document classification component 682.

TABLE 2

| Column Name in Training Database | Value Examples |
| --- | --- |
| Image Path | Image Repository location |
| Image Unique Identifier | 2020-10-15_02-33-32-tg_87a15c283d7c43zf89e1t61be9152b9d |
| OCR Engine Processed | OCR Engine 1, OCR Engine 2, OCR Engine 3 |
| Confidence Score | 90%, 92.1%, 93.9% |
| Document Image Class | Deed of Trust |
| Document Image Confidence | 95% |

The bounding box parser 680 further includes a ROI and rank component 683 configured to identify bounding boxes (e.g., coordinates) containing ROI (e.g., regions containing sensitive element and identifier), identify a class of each ROI, and rank each OCR engine that was applied to determine which OCR engine generated an OCR file that, when parsed, resulted in the best individual bounding box confidence score. Component 683 may be used to identify as many ROIs as possible and variations within the ROI across multiple sensitive classes and multiple document classes. For example, FIG. 2A depicts variations of SSN region bounding boxes, variations of DOB region bounding boxes, and variations of driver license bounding boxes, that component 683 of parser 680 may capture. By way of illustration, Table 3 shows an example of metadata that may be stored for each region class by by ROI and rank component 683.

TABLE 3

| Column Name in Training Database | Value Examples |
| --- | --- |
| Image Path | Image Repository location |
| Image Unique Identifier | 2020-10-15_02-33-32-tg_87a15c283d7c43zf89e1t61be9152b9d |
| OCR Engine Processed | OCR Engine 1, OCR Engine 2, OCR Engine 3 |
| Confidence Score | 90%, 92.1%, 93.9% |
| Document Image Class | Deed of Trust |
| Document Image Confidence | 95% |
| Region Class and Label | 2-SSN |
| Region Label Coordinates | 0.78588, 0.425909, 0.232941, 0.030000 |
| Region Rank OCR | OCR Engine 3 |
| Region Rank Confidence | 93.9% |

OCR engines may be ranked by comparing confidence scores generated by running the parser on ROI identified from each set of OCR text, and the OCR engine associated with the highest confidence score may be picked (e.g., as depicted in Table 3 above). The use and comparison of multiple OCR engines may be useful in gathering higher quality data labels for each of the individual NPI classes.

The initial coordinates from the highest confidence OCR engine may still be reviewed by human labelers to adjust for tilts, tightness, and/or potential misses on the same page for the same or other NPI classes, as further described below. In alternative implementations, only one OCR engine is used to build training database 690.

The bounding box parser 680 further includes a human labeling component 684 configured to receive data corresponding to user input providing verification of labels and bounding boxes generated using component 683. For example, there may be instances where a bounding box is not tightly bound on all four corners, the bounding box does not account for text tilt, or there is a low confidence of a labeled region. This may be determined by sampling the region rank confidence scores for each bounding box. In some implementations, a subset of images (e.g., 20%, 30%, 40%, 50%, etc.) may be displayed to a user for human inspection of the labels and adjustment. The subset of images that are displayed for inspection may depend on the region rank confidence scores. For example, a greater subset of regions having lower confidence scores may be inspected as compared to regions having higher confidence scores. The foregoing human labeling component 684 may be particularly useful when the OCR output incorrect text (e.g., due to poor image quality, or if a watermark overlaps with the text), causing the parser to miss ROI. In some implementations, a GUI may be displayed to the user that includes one or more controls or tools for labeling missed sensitive patterns and/or adjusting the bounding boxes for misaligned sensitive patterns. The user adjustments made using human labeling component 684 may be stored in training database 690. By way of illustration, Table 4 shows an example of metadata that may be stored in training database 690 after human adjustment for a label having a relatively low confidence (63.9%).

TABLE 4

| Column Name in Training Database | Value Examples |
| --- | --- |
| Image Path | Image Repository location |
| Image Unique Identifier | 2022-3-15_12-31-44-pm_47f16c9sdi9832p5d |
| OCR Engine Processed | OCR Engine 1, OCR Engine 2, OCR Engine 3 |
| Confidence Score | 40% , 52.1%,63.9% |
| Document Image Class | Deed of Trust |
| Document Image Confidence | 95% |
| Region Class and Label | 2-SSN |
| Region Label Coordinates | 0.78588, 0.425909, 0.232941, 0.030000 |
| Region Rank OCR | OCR Engine 3 |
| Region Rank Confidence | 63.9% |
| Validated Manually | Y |
| Labeled Manually | Y |
| User | jdoe |
| New Region Label Coordinates (Human) | 0.88588, 0.525909, 0.532941, 0.130000 |

Figure 8:
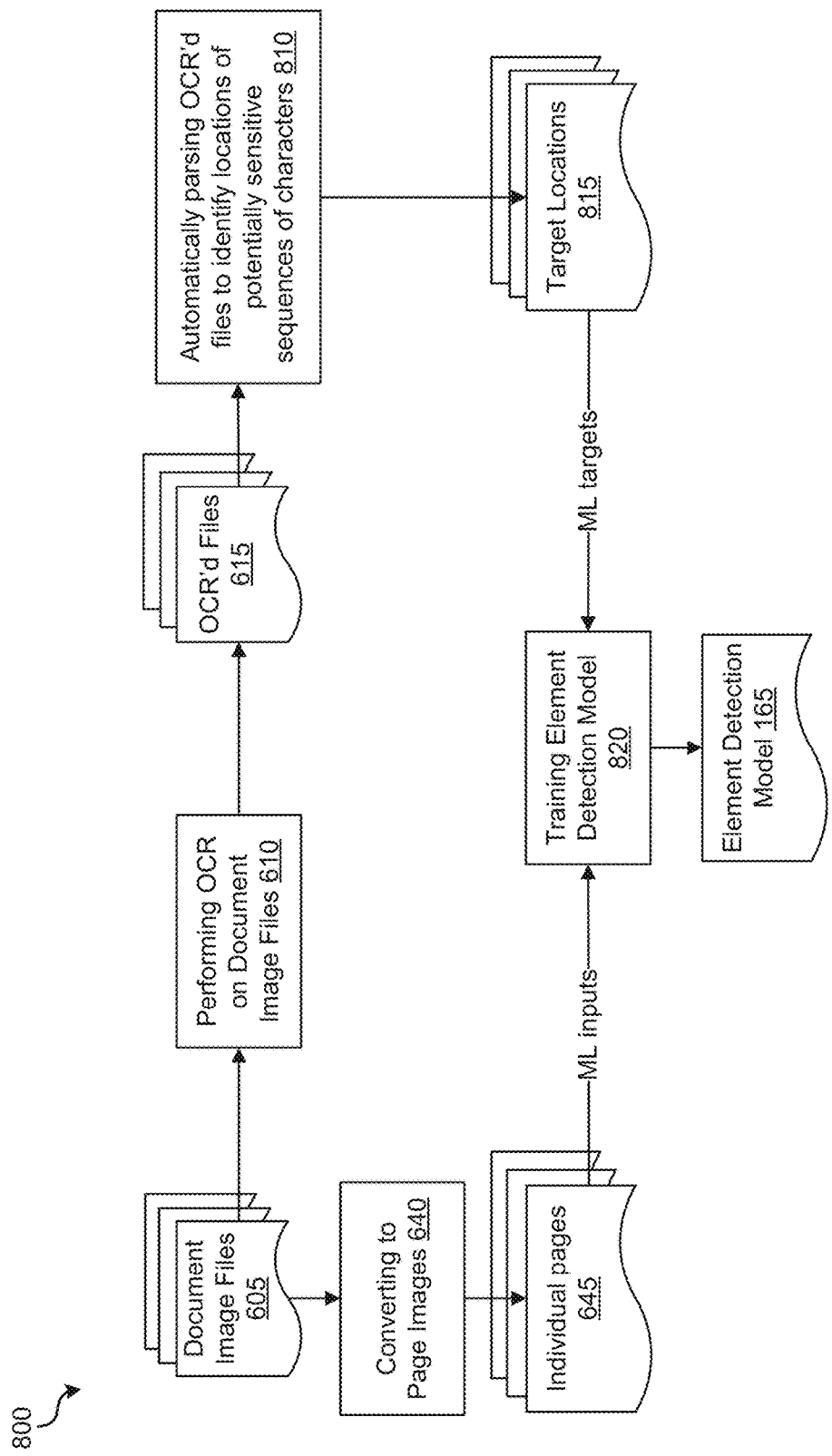
FIG. 8 is an operational flow diagram illustrating an example method of building an element detection model from a dataset of unlabeled document image files, in accordance with some implementations of the disclosure.

FIG. 8 is an operational flow diagram illustrating an example method 800 of building an element detection model 165 from a dataset of unlabeled document image files 605, in accordance with some implementations of the disclosure. As depicted, the document image files 605 may be the same files used to build the region detection model. Operation 610 for obtaining OCR'd files 615 and operation 640 for obtaining individual pages 645 may be performed in a manner similar to that described above with respect to method 600. In some implementations, the same OCR'd files may be used to build each of the models described herein in parallel or serially.

Operation 810 includes automatically parsing each of the OCR'd files 615 to identify target locations 815 (e.g., bounding box coordinates) of potentially sensitive sequences of characters. A parser implementing regex rules adapted to find sequences or patterns of characters/text within the OCR'd files may be used. For example, it may be adapted to find combinations of a certain number of characters that may be NPI (e.g., 6-16 characters of sensitive pattern classes such as SSN, date of birth, passport, driver's license.) Because many NPI elements may look the same when taken out of context, i.e. when there is no descriptor such as Driver License #right next to it, the parser may be configured to identify all 6-16 digit numbers or alphanumeric strings that might potentially be NPI. For each identified text string, the parser may return its location. The location of the string returned by the parser may be mapped to pixel coordinates in a page of the document image file 605 corresponding to the OCR'd file 615 that was parsed. In some implementations, a single generic class label may be used to identify each of the different target locations 815 corresponding to potentially sensitive sequences of characters.

Operation 820 includes training an element detection model 165 based on a training dataset including an input dataset and a target dataset. In this case, the element detection model is trained to extract features from an input page image, and output a target prediction of the location (e.g., bounding box expressed as pixel coordinates) of each location in the image that contains potentially sensitive sequences of characters, if any are found. As such the input training dataset may include at least some of the individual page images 645. The target training dataset may include at least some of the target locations 815. The element detection model may also output a confidence score and an element label associated with each prediction. The element label, in some embodiments, is a generic label used for all detected instances of all potentially sensitive sequences of characters.

As in the case of the region detection model, the element detection model may be trained as an object detection model. For example, it may be based on a one-stage object detection algorithm such as YOLO, RetinaNet, SSD, or the like. Alternatively, it may be based on a two-stage object detection algorithm.

Figure 9:
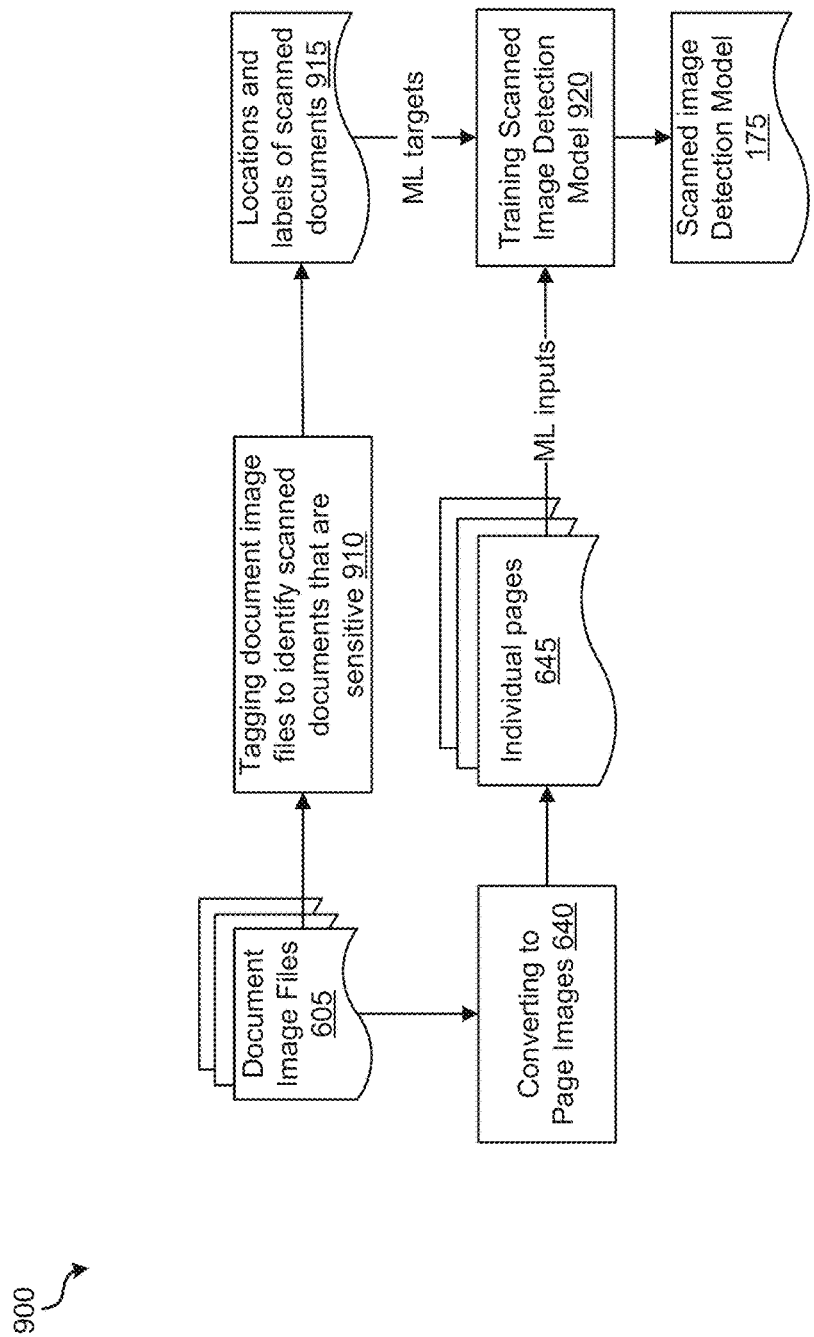
FIG. 9 is an operational flow diagram illustrating an example method of building a scanned image detection model from a dataset of unlabeled document image files, in accordance with some implementations of the disclosure.

FIG. 9 is an operational flow diagram illustrating an example method 900 of building a scanned image detection model 175 from a dataset of unlabeled document image files 605, in accordance with some implementations of the disclosure. As depicted, the document image files 605 may be the same files used to build the region detection model. Operation 640 for obtaining individual pages 645 may be performed in a manner similar to that described above with respect to method 600. In some implementations, the same OCR'd files may be used to build each of the models described herein in parallel or serially.

Operation 910 includes tagging the document image files to identify locations (e.g., pixel coordinates) and labels scanned documents 915 that are sensitive. A GUI may be presented for a user to hand tag (e.g., drawing bounding boxes and adding labels such as "social security card") scanned documents such as drivers licenses, passports, credit cards, social security cards, check images, green cards, and the like. To speed up the process, only a subset of document image files 605 known to potentially contain scanned documents may be selected for hand labeling. During hand tagging, a user may utilize one or more controls or tools for drawing bounding boxes and adding labels.

Operation 920 includes training a scanned image detection model 175 based on a training dataset including an input dataset and a target dataset. In this case, the scanned image detection model is trained to extract features from an input page image, and output a target prediction of the location (e.g., bounding box expressed as pixel coordinates) and label of each location in the image that contains a scanned document such as a social security card, if any are found. As such the input training dataset may include at least some of the individual page images 645. The target training dataset may include at least some of the locations and labels of scanned documents 915. The scanned image detection model 175 may also output a confidence score associated with each prediction.

As in the case of the region detection model and the element detection model, the scanned image detection model may be trained as an object detection model. For example, it may be based on a one-stage object detection algorithm such as YOLO, RetinaNet, SSD, or the like. Alternatively, it may be based on a two-stage object detection algorithm.

Figure 10:
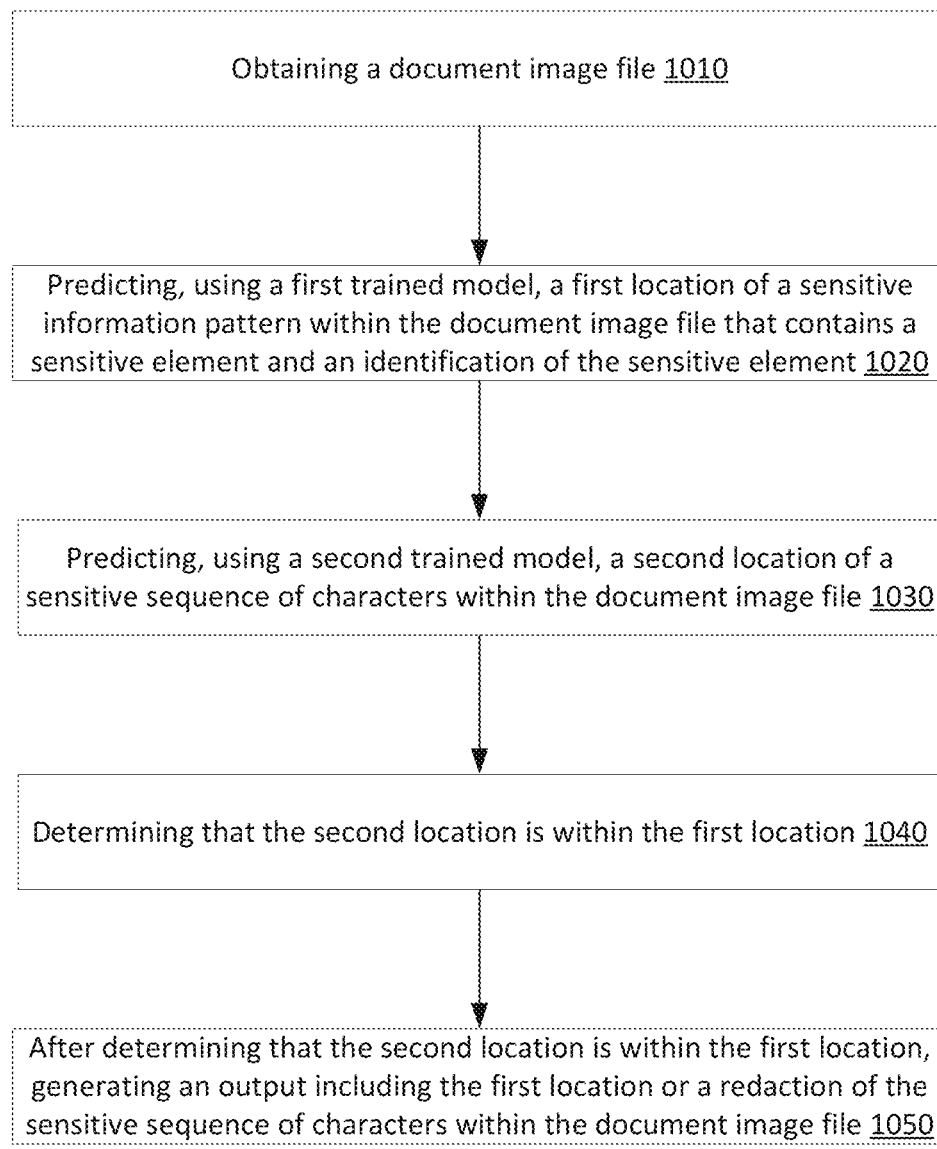
FIG. 10 is an operational flow diagram illustrating an example method of combining the result of two different image-based models to detect sensitive elements within a document, in accordance with some implementations of the disclosure.

FIG. 10 is an operational flow diagram illustrating an example method 1000 of combining the result of two different image-based models to detect sensitive elements within a document, in accordance with some implementations of the disclosure.

Operation 1010 includes obtaining a document image file. For example, a document image file as illustrated by FIG. 3 may be obtained. The document image file may be in a PNG, TIFF, PDF, or other image format. The document image file includes one or more pages that potentially include sensitive date elements such as NPI in the form of text, numbers, or scanned document images.

Operation 1020 includes predicting, using a first trained model, a first location of a sensitive information pattern within the document image file that contains a sensitive element and an identification of the sensitive element. Based on features of an image of the document image file, the first trained model may detect one or more sensitive information patterns within the image that contain a sensitive element and associated identification. The first trained model may be a region detection model 155 as described herein. During runtime, the region detection model 155 may divide an input page into a grid, and for each cell in the grid, detect objects (e.g., object location and class).

The first location predicted using the model may include a first set of coordinates within the document image. For example, four x,y coordinates may be used to define a bounding box in the image. In some implementations, the first trained model may output a confidence score associated with the prediction. In implementations, the prediction of the first trained model also includes a label indicative of the identifier associated with the prediction. For example, the first trained model may output a descriptive class label (e.g., "SSN", "DOB", or "License") or a numerical class label (e.g., "1", "2", "3") indicative of a class of the identifier.

Figure 11:
FIG. 11 is an example showing bounding boxes illustrating identified locations in the document of FIG. 3 of multiple sensitive information patterns including sensitive elements and identifiers, in accordance with some implementations of the disclosure.

FIG. 11 is an example showing bounding boxes illustrating identified locations in the document of FIG. 3 of multiple sensitive information patterns including sensitive elements and identifiers, identified by applying the first trained model. In this example, the sensitive information patterns that were identified include: "Date of Birth: Feb. 5, 1985", "Social Security No.: 123-45-6789", "Driver License No.: AB9876", and "passport number is 2456798". The sensitive elements include "Feb. 5, 1985", "123-45-6789", "AB9876", and "2456798". The identifiers of the sensitive elements include: "Date of Birth", "Social Security No.", "Driver License No.", and "passport number". In this instance, the model may output class labels (e.g., numerical or descriptive) indicative of each of these identifiers.

Operation 1030 includes predicting, using a second trained model, a second location of a potentially sensitive sequence of characters within the document image file. Based on features of an image of the document image file, the second trained model may detect one or more potentially sensitive sequences of characters within the image. The second trained model may be an element detection model 165 as described herein. The second location predicted using the second trained model may include a second set of coordinates within the document image. For example, four coordinates may be used to define a bounding box in the image. In some implementations, the second trained model may output a confidence score associated with the prediction.

Figure 12:
FIG. 12 is an example showing bounding boxes illustrating identified locations in the document of FIG. 3 of multiple potentially sensitive sequences of characters, in accordance with some implementations of the disclosure.

FIG. 12 is an example showing bounding boxes illustrating identified locations in the document of FIG. 3 of multiple potentially sensitive sequences of characters, identified by applying the second trained model. In this example, the sequences include: "Feb. 5, 1985", "123-45-6789", "AB9876", "2456798", "6100-948274", "AX-432872-1992", and "Apr. 5, 2007".

Operation 1040 includes determining that the second location is within the first location. The determination may be that second location is partially or completely within the second location. For example, if the first location is a first bounding box defined by the following coordinates (x_min=1, x_max=4, y_min=1, y_max=4), and the second location is a second bounding box defined by the following coordinates (x_min=2, x_max=3, y_min=2, y_max=3), then the second bounding box is completely within the first bounding box. As described herein, the coordinates of a given location may refer to pixel coordinates within a page of a document image file.

Figure 16:
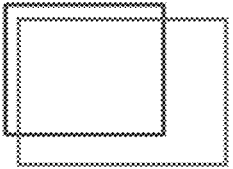
FIG. 16 depicts an example table visually showing an intersection decision for different bounding boxes between first and second locations determined using the method of FIG. 14, in accordance with some implementations of the disclosure.
Figure 17:
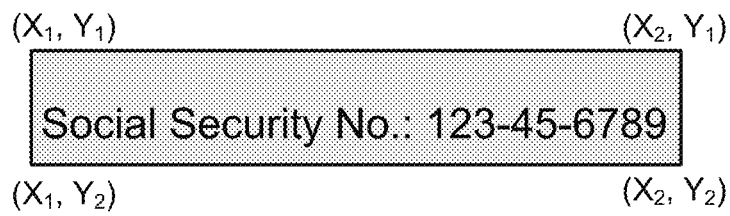
FIG. 17 depicts one particular method of determining the amount of intersection between first and second locations determined using the method of FIG. 14, in accordance with some implementations of the disclosure.
Figure 17:
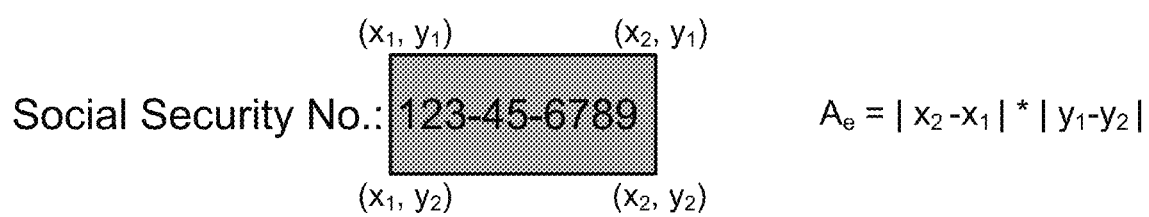
Figure 17:
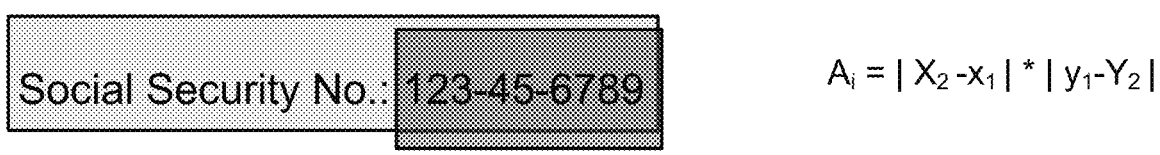
Figure 18:
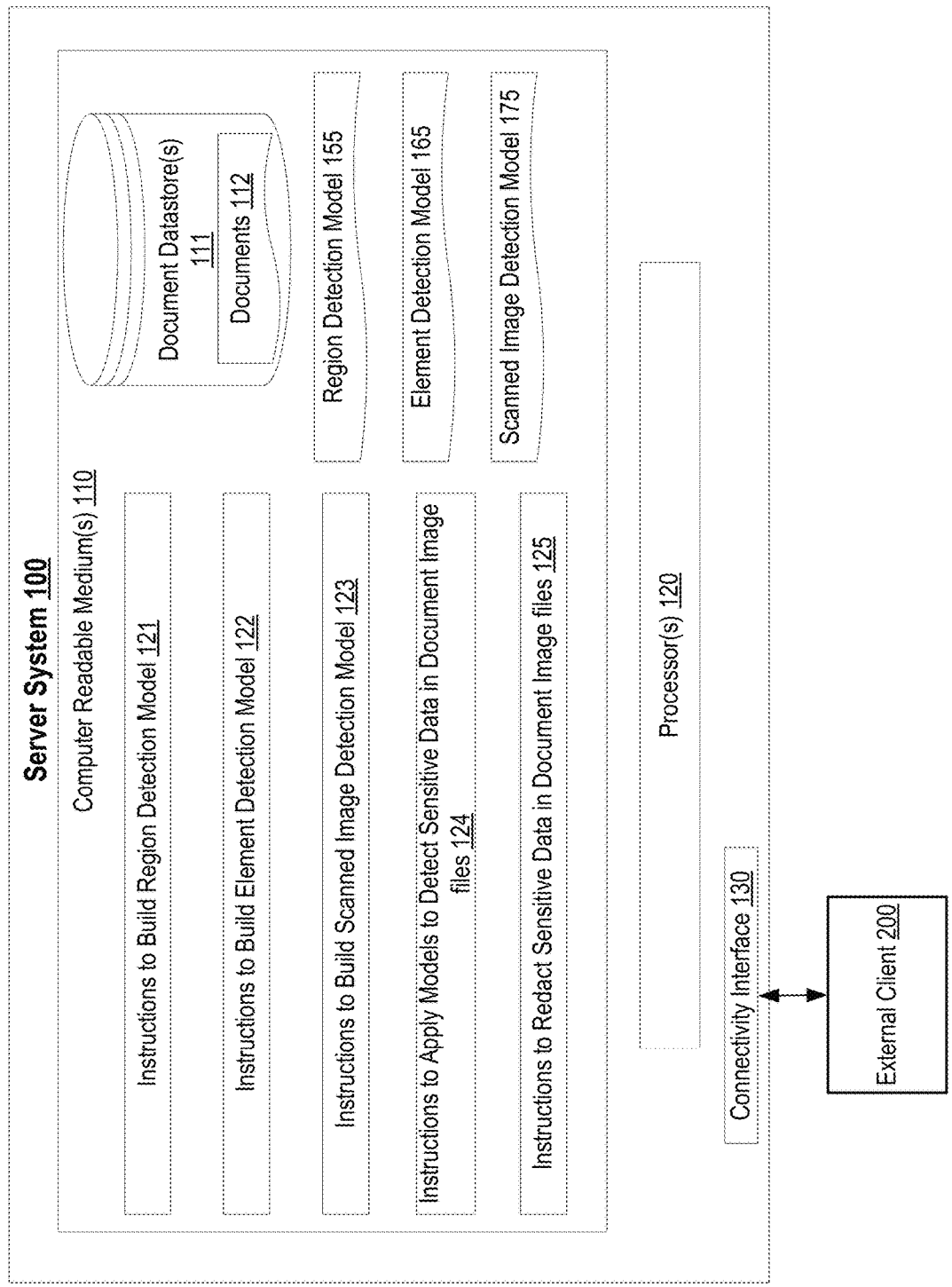
FIG. 18 is a block diagram illustrating a server system, in accordance with some implementations of the disclosure.

In a some implementations, determining that the second location is within the first location comprises determining that a level of intersection between the first location and the second location meets a threshold. This threshold may be user configurable. For example, FIG. 16 depicts an example table visually showing an intersection decision for different bounding boxes. In this example, assume the threshold is set to 90% intersection. As illustrated, the first intersection falls below the threshold whereas the second and third pass the threshold. In one particular implementation, depicted by FIG. 17, the level of intersection may be computed by dividing the area of intersection ($A_i$) between the two locations (e.g., intersection area of bounding boxes) by the area of the second location ($A_e$), e.g., the area of the bounding box of potentially sensitive sequence of characters). For example, if the threshold is set to 80% or 0.8, and $A_i/A_e$ is at least 0.8, then the threshold is met.

Operation 1050 includes after determining that the second location is within the first location, generating an output including the first location or a redaction of the sensitive sequence of characters within the document image file. For example, in some implementations, the sensitive sequence of characters may be redacted within the document image file, and the redacted document image file may be made available. As another example, the coordinates of one or more redacted sequences of characters may be output. This data may be output as metadata including a confidence score associated with the prediction.

Figure 13:
FIG. 13 is an example showing bounding boxes illustrating sensitive element locations identified after combining the results of first and second trained models, in accordance with some implementations of the disclosure.

FIG. 13 is an example showing bounding boxes illustrating sensitive element locations identified after combining the results of first and second trained models as described herein (i.e., the results illustrated in FIGS. 11 and 12). As illustrated in this example, by virtue of combining the results of both models, any false positives are omitted from the results (e.g., false positive identifying the date "Apr. 5, 2007" as a sensitive element). Another advantage of this approach is that it avoids labeling identifiers of sensitive elements (e.g., the identifier "Date of Birth") as sensitive, which helps improve the precision of sensitive data element detection and redaction.

illustrating identified locations in the document of FIG. 3 of multiple potentially sensitive sequences of characters. In this example, the sequences include: "Feb. 5, 1985", "123-45-6789", "AB9876", "2456798", "6100-948274", "AX-432872-1992", and "Apr. 5, 2007".

Although the foregoing example has been illustrated with respective to identifying sensitive elements within a single image or page of a document image file, it should be appreciated that the techniques described herein may apply to document image files including multiple images or pages. In such cases, the application of the first trained model and the second trained model, and the combination of the results of applying both models, may be done on a per page basis.

In some implementations, when the first trained model does not identify a sensitive information pattern within a given page of a document image file, the second trained model may not be applied to the page. One advantage of this approach is that it may improve the computational speed at which sensitive elements are identified on a per page basis.

In some implementations, when the first trained model identifies a sensitive information pattern within a location of a document image file, but the second trained model does not identify a potentially sensitive sequence of characters within that location, the identification from the first trained model may be ignored or flagged for user review via a user interface such as a GUI. One advantage of this approach is that it helps avoid false positive identifications of sensitive information.

Figure 14:
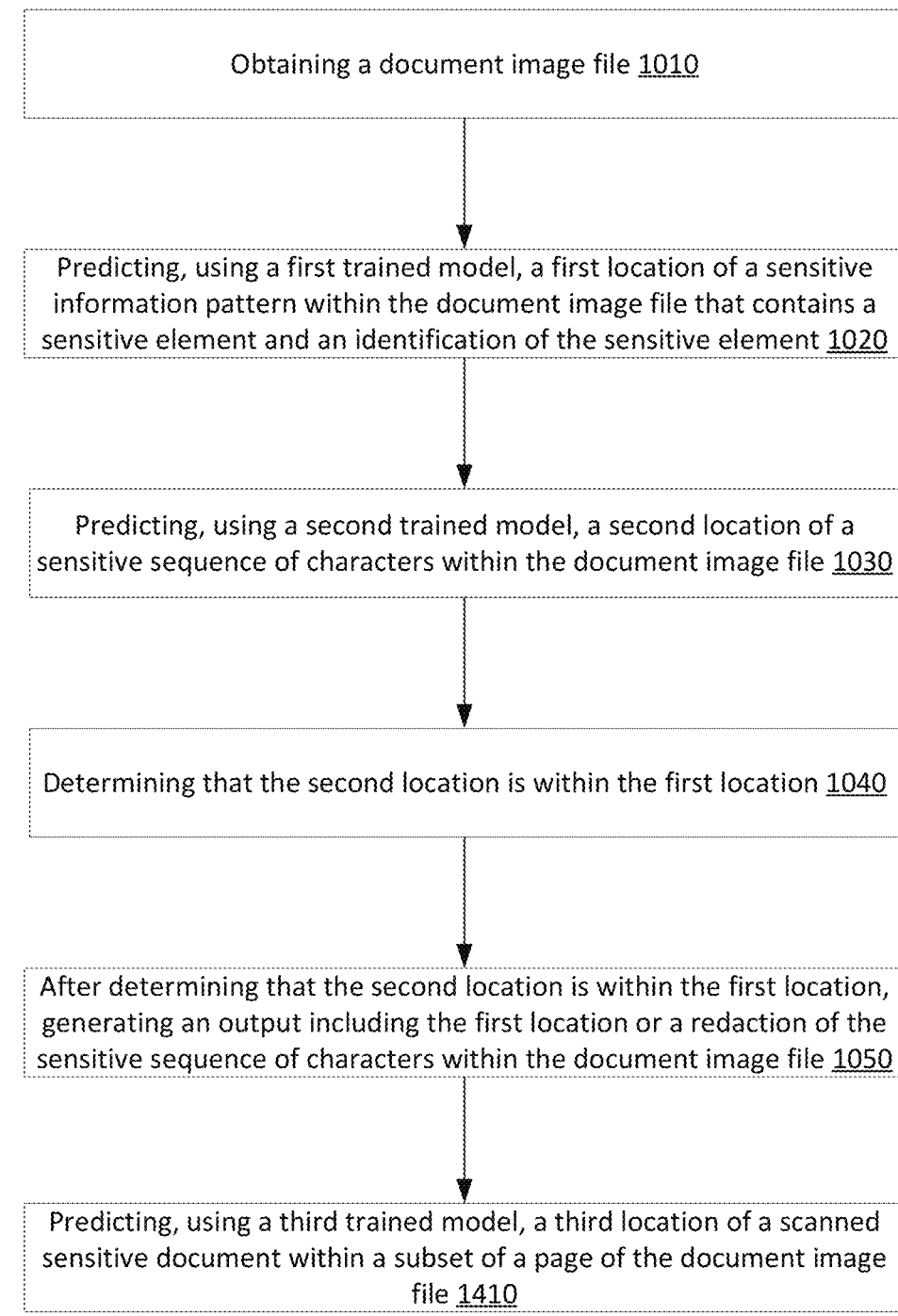
FIG. 14 is an operational flow diagram illustrating an example method of using three different image-based models to detect sensitive elements within a document, in accordance with some implementations of the disclosure.

In some implementations, in addition to utilizing first and second trained models to identify sensitive text and numbers within a document image file, a third trained model may be used to identify sensitive scanned document images within the document image file. To this end, FIG. 14 is an operational flow diagram illustrating an example method 1400 of using three different image-based models to detect sensitive elements within a document, in accordance with some implementations of the disclosure. In addition to operations 1010-1050, method 1400 includes operation 1410, which includes predicting, using a third trained model, a third location of a scanned sensitive document within a subset of a page of the document image file 1410.

Figure 15:
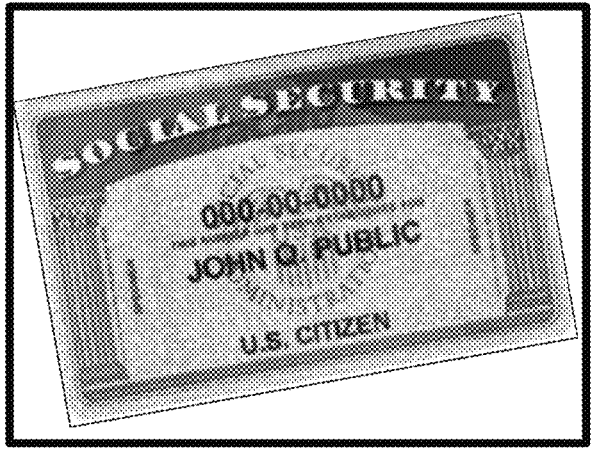
FIG. 15 is an example showing a bounding box illustrating an identified location in the document of FIG. 3 of a scanned sensitive document, identified by applying the third trained model, in accordance with some implementations of the disclosure.

FIG. 15 is an example showing a bounding box illustrating an identified location in the document of FIG. 3 of a scanned sensitive document (social security card), identified by applying the third trained model.

It should be appreciated that in applications involving document image files that do not contain scanned sensitive documents such as ID cards and bank cards, the use of the third trained model (e.g., scanned image detection model 175) may be skipped.

FIG. 16 is a block diagram illustrating a server system 100, in accordance with some implementations of the disclosure. The server system 100 comprises at least one computer readable medium 110 upon which are stored instructions that, when executed by a processor 120, cause server system 100 to carry-out implementations of the disclosure. Server system 100 further comprises, at least one processor 120, and a connectivity interface 130. In this example, at least one computer readable medium 110 includes at least one document datastore 111 storing documents 112, and trained models 155, 165, and 175. The documents 112 may include thousands, millions, or even billions of documents stored in a document image format (e.g., pdf, png, tiff, etc.). For example, in implementations where server system 100 is utilized by a title insurance company, these documents may comprise deeds, mortgages, and various other documents relating to parcels of real property from different states and counties.

In some implementations, all or a subset of the documents 112 may include documents having sensitive data elements that have been previously identified (e.g., by implementing the techniques described herein). The locations (e.g., image coordinates) of the identified sensitive data elements may be stored along with the documents in the same or separate data files.

The at least one computer readable medium 110 also stores instructions 121 that, when executed by a processor 120, cause server system 100 to build a region detection model 155. For example, execution of instructions 121 may cause server system 100 to perform operations of method 600 and/or utilize the components depicted in FIG. 7 to build a training database 690. The at least one computer readable medium 110 also stores instructions 122 that, when executed by a processor 120, cause server system 100 to build the element detection model 165. For example, execution of instructions 122 may cause server system 100 to perform operations of method 800. The at least one computer readable medium 110 also stores instructions 123 that, when executed by a processor 120, cause server system 100 to build the scanned image detection model 123. For example, execution of instructions 123 may cause server system 100 to perform operations of method 900.

The at least one computer readable medium 110 further stores instructions 124 that, when executed by a processor 120, cause server system 100 to apply multiple models to detect sensitive data in document image files. For example, execution of instructions 124 may cause server system 100 to perform operations of method 1000, operations of method 1400, operation 220, or operation 230. The at least one computer readable medium 110 further stores instructions 125 that, when executed by a processor 120, cause server system 100 to redact sensitive data in document files. For example, execution of instructions 125 may cause server system 100 to perform operation 240.

Connectivity interface 130 is configured to provide server system 100 with wired and/or wireless communication with external clients 200 via a direct and/or indirect connection over one or more communication networks.

In this document, the terms "machine readable medium," "computer readable medium," and similar terms are used to generally refer to non-transitory mediums, volatile or non-volatile, that store data and/or instructions that cause a machine to operate in a specific fashion. Common forms of machine readable media include, for example, a hard disk, solid state drive, magnetic tape, or any other magnetic data storage medium, an optical disc or any other optical data storage medium, any physical medium with patterns of holes, a RAM, a PROM, EPROM, a FLASH-EPROM, NVRAM, any other memory chip or cartridge, and networked versions of the same.

These and other various forms of computer readable media may be involved in carrying one or more sequences of one or more instructions to a processing device for execution. Such instructions embodied on the medium, are generally referred to as "instructions" or "code." Instructions may be grouped in the form of computer programs or other groupings. When executed, such instructions may enable a processing device to perform features or functions of the present application as discussed herein.

In this document, a "processing device" may be implemented as a single processor that performs processing operations or a combination of specialized and/or general-purpose processors that perform processing operations. A processing device may include a CPU, GPU, APU, DSP, FPGA, ASIC, SOC, and/or other processing circuitry.

The various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

Each of the processes, methods, and algorithms described in the preceding sections may be embodied in, and fully or partially automated by, code components executed by one or more computer systems or computer processors comprising computer hardware. The processes and algorithms may be implemented partially or wholly in application-specific circuitry. The various features and processes described above may be used independently of one another or may be combined in various ways. Different combinations and sub-combinations are intended to fall within the scope of this disclosure, and certain method or process blocks may be omitted in some implementations. Additionally, unless the context dictates otherwise, the methods and processes described herein are also not limited to any sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A non-transitory computer-readable medium having executable instructions stored thereon that, when executed by a processor, cause the processor to perform operations comprising:
    obtaining a document image file;
    generating, using a first trained model, a first prediction including a first location of a sensitive information pattern within the document image file that contains a sensitive element and an identification of the sensitive element;
    generating, using a second trained model, a second prediction including a second location of a first sensitive sequence of characters within the document image file;
    determining that the second location is within the first location; and
    after determining that the second location is within the first location, generating an output including the second location or a redaction of the first sensitive sequence of characters within the document image file.

2. The non-transitory computer-readable medium of claim 1, wherein the operations further comprise: generating, using a third trained model, a third prediction including a third location of a scanned document within a subset of a page of the document image file.

3. The non-transitory computer-readable medium of claim 2, wherein generating the output comprises:
    in response to determining that the second location is within the first location, redacting, based on the second location, the first sensitive sequence of characters within the document image file;
    redacting, based on the third location, the scanned document within the document image file; and
    after redacting the first sensitive sequence of characters and the scanned document within the document image file, transmitting the document image file.

4. The non-transitory computer-readable medium of claim 2, wherein:
    the second location comprises a first set of coordinates within the document image file;
    the third location comprises a second set of coordinates within the document image file; and
    generating the output, comprises: returning the first set of coordinates and the second set of coordinates.

5. The non-transitory computer-readable medium of claim 2, wherein:
    the first sensitive sequence of characters comprises: a birthdate, an address, a phone number, or an identification number; and
    the scanned document comprises: an identification card, a bank card, or a check.

6. The non-transitory computer-readable medium of claim 1, wherein determining that the second location is within the first location, comprises: determining that an area of intersection between the first location and the second location meets a threshold.

7. The non-transitory computer-readable medium of claim 6, wherein determining that the area of intersection between the first location and the second location meets the threshold comprises: comparing the area of intersection to an area of the second location.

8. The non-transitory computer-readable medium of claim 6, wherein the first trained model is a first object detection model and the second trained model is a second object detection model.

9. The non-transitory computer-readable medium of claim 1, wherein:
the first prediction further includes a label indicative of the identification of the sensitive element; and
generating the output, comprises: returning the second location and the label.

10. The non-transitory computer-readable medium of claim 1, wherein the operations further comprise generating the first trained model by:
obtaining multiple textual data representations of multiple document image files;
identifying, using at least regular expression-based rules, and the multiple textual data representations, multiple locations within the multiple document image files and multiple labels corresponding to the multiple locations, wherein each of the multiple locations contains a potentially sensitive information pattern including a sensitive element and an identification of the sensitive element, and each label is indicative of the identification of the sensitive element of a corresponding one of the locations; and
training, based on the multiple document image files, the multiple locations, and the multiple labels, an object detection model as the first trained model.

11. The non-transitory computer-readable medium of claim 1, wherein the operations further comprise generating the second trained model by:
obtaining multiple textual data representations of multiple document image files;
identifying, using at least regular expression-based rules, multiple text strings within the multiple textual data representations that potentially contain sensitive information;
determining a location of each of the multiple text strings within the multiple document image files; and
training, based on the multiple document image files and the locations of the multiple text strings, a model as the second trained model.

12. A method, comprising:
obtaining, at a computing device, a document image file;
generating, at the computing device, using a first trained model, a first prediction including a first location of a sensitive information pattern within the document image file that contains a sensitive element and an identification of the sensitive element;
generating, at the computing device, using a second trained model, a second prediction including a second location of a first sensitive sequence of characters within the document image file;
determining, at the computing device, that the second location is within the first location; and
after determining that the second location is within the first location, generating, at the computing device, an output including the second location or a redaction of the first sensitive sequence of characters within the document image file.

13. The method of claim 12, wherein the method further comprises: generating, at the computing device, using a third trained model, a third prediction including a third location of a scanned document within a subset of a page of the document image file.

14. The method of claim 13, wherein generating the output comprises:
in response to determining that the second location is within the first location, redacting, based on the second location, the first sensitive sequence of characters within the document image file;
redacting, based on the third location, the scanned document within the document image file; and
after redacting the first sensitive sequence of characters and the scanned document within the document image file, transmitting the document image file.

15. The method of claim 13, wherein:
the second location comprises a first set of coordinates within the document image file;
the third location comprises a second set of coordinates within the document image file; and
generating the output, comprises: returning the first set of coordinates and the second set of coordinates.

16. The method of claim 13, wherein:
the first sensitive sequence of characters comprises: a birthdate, an address, a phone number, or an identification number; and
the scanned document comprises: an identification card, a bank card, or a check.

17. The method of claim 12, wherein determining that the second location is within the first location, comprises: determining that an area of intersection between the first location and the second location meets a threshold.

18. The method of claim 17, wherein determining that the area of intersection between the first location and the second location meets the threshold comprises: comparing the area of intersection to an area of the second location.

19. The method of claim 17, wherein the first trained model is a first object detection model and the second trained model is a second object detection model.

20. A system, comprising:
a processor; and
a non-transitory computer-readable medium having executable instructions stored thereon that, when executed by the processor, cause the system to perform operations comprising:
obtaining a document image file;
generating, using a first trained model, a first prediction including a first location of a sensitive information pattern within the document image file that contains a sensitive element and an identification of the sensitive element;
generating, using a second trained model, a second prediction including a second location of a first sensitive sequence of characters within the document image file;
determining that the second location is within the first location; and
after determining that the second location is within the first location, generating an output including the second location or a redaction of the first sensitive sequence of characters within the document image file.

* * * * *